United States Patent [19]

Powell et al.

[11] Patent Number: 4,627,507

[45] Date of Patent: Dec. 9, 1986

[54] MOUNTING FOR DOUBLE-ENDED SHEAR BEAM LOAD CELLS

[75] Inventors: David L. Powell, Stayton, Oreg.; Philip W. Bair, Jasper, Ala.

[73] Assignee: Powell All-Steel Scales, Inc., Jasper, Ala.

[21] Appl. No.: 766,509

[22] Filed: Aug. 19, 1985

[51] Int. Cl.$^4$ .................. G01G 3/14; G01G 21/24
[52] U.S. Cl. ..................................... 177/211; 177/255
[58] Field of Search ................................. 177/211, 255

[56] References Cited

U.S. PATENT DOCUMENTS 4,516,645  5/1985  Wetzel ........................... 177/255 X
4,549,622 10/1985  Leiman ........................... 177/211 X Primary Examiner—George H. Miller, Jr.
Attorney, Agent, or Firm—Jennings, Carter, Thompson & Veal

[57] ABSTRACT

A load cell fixture utilizes a supporting frame to support a load cell in a position that it is not susceptible to torsional or longitudinal forces displacing the load cell from its initial positioning. A pair of link members connect an upper pin which rests atop the load cell to a lower pin beneath the load cell, with the lower pin supporting the weight of the element to be weighed. The links and pins are arranged to allow the upper pin to provide a constant direction of force to the load cell and eliminates inaccuracies due to movement of the load. A suspension support is also provided to reduce rebound shock from the sub-structure into the load cell.

14 Claims, 7 Drawing Figures

MOUNTING FOR DOUBLE-ENDED SHEAR BEAM LOAD CELLS

BACKGROUND OF THE INVENTION

The present invention relates generally to industrial scales for measuring large loads through the use of electromechanical load cells and more particularly the invention relates to mounting apparatus for positioning such load cells for use in such scales to improve the accuracy and longevity of such load cells.

A load cell, as used in the scales to which the present invention pertains, is critically calibrated at the manufacturer's laboratory. The load cell must be mounted at specified precise points and it must be loaded at a specified point. The particular type load cell to be used with the present invention is a double-end shear beam load cell. This type of load cell may be mounted in one of two ways, to wit: each end of the load cell may be affixed to a support structure and the load supplied to the load cell on the top thereof at the center line; or the load cell may be mounted to the support structure in the middle and accept the load at each end of the cell. Mounting the cell in the second manner requires a more expensive load cell. The load cell should not be permitted to move, swing or twist in the mounting inasmuch as any variation from the exact points of loading and mounting will cause weighing errors and/or damage to the cell. The cell should also be under no pressure in the mounting inasmuch as a binding condition will result if the cell is fastened down too tightly to the stand; yet, if it is too loose, the load cell will rock or twist and either condition causes errors and/or damage.

Conventionally when the load cell accepts the load in the center, the ends of the load cell are bolted or pinned down to a rigid stand. A weigh bridge on the scale is supported on a pedestal or on a girder chair which in turn is supported by a type of pin or link which rests directly on the load cell. The weigh bridge receives shock in the course of loading the scale and moves when the scale is loaded. This shock and movement is transmitted through the pedestal directly to the load cell, which is ideally stationary. When the weigh bridge moves, the pedestal moves and consequently the point of loading on the load cell also moves; therefore inaccuracies in the scale measurement result. To compensate for the movement, prior art has used a plurality of check stays to attempt to stabilize the weigh bridge. Such compensation creates additional problems inasmuch as the steel weigh bridge may be damaged if the check stays hold it too rigidly or the weigh bridge may bind against the stay which causes weighing inaccuracies.

When the load cell is configured to accept the load from the weigh bridge on each end thereof, the cell is mounted to a rigid stand at its center. Links are suspended directly from the load cell at each end. These links are connected to a common lower weight bearing pin which extends beyond each end of the load cell. The pedestal supporting the weigh bridge rests on this lower pin and again the movement of the pedestal is transferred to the lower pin. The lower pin exerts downward and lateral force on the links which swing directly on the load cell. The links are swinging and also twisting thus creating excessive wearing conditions between the links and the load cell and varying the point of loading on the load cell thus resulting in inaccuracies. As noted in the alternative method of mounting, the shock from the weigh bridge is transferred to the load cell, through the load cell into the stand and then rebounds from the stand into the load cell. Since the standard mountings apply the load directly from the scale weigh bridge pedestal to the load cell, the shock is substantial. The damage which occurs to the load cell due to the shock of loading can be extensive. In addition the rigid fastening of the load cell to the steel in the stand below the load cell results in a second shock when the shock rebounds from the rigid stand.

SUMMARY OF THE INVENTION

The primary object of the invention is to provide a load cell mounting fixture which maintains the loading point on a load cell in order to provide a more accurate weighing condition.

Another object of the invention is to provide a mounting structure for a load cell which maintains the load cell in a stationary position and does not subject the load cell to forces which would cause rotational or longitudinal movement.

Yet another object of the present invention is to provide a mounting structure for a load cell which reduces the rebound shock applied to the load cell.

Yet another object of the invention is to provide a load cell mounting structure with adjustable bearing surfaces to provide increased longevity.

Yet another object of the invention is to provide a load cell mounting structure which is highly stable and provides improved resistance to distortion.

These and other objects are advantageously accomplished in my invention by the utilization of an upper and lower weight bearing pin in conjunction with connective links therebetween. The load cell ismounted in its stand although it is not mounted so tightly as to cause binding. The upper weight bearing pin rests across the load cell at the precise loading point desired. Two links depend from the ends of the upper weight bearing pin and are connected to the lower pin which supports a pedestal on which a weigh bridge is supported. As previously noted the movement of the weigh bridge causes movement on the pedestal which in turn transmits this movement to the lower pin. However the movement is reduced through the two links connecting the lower pin to the upper pin; thus the upper pin experiences no motion and exerts pressure on the load cell in a constant downward direction. This is the ideal loading on the cell. The stand for the load cell may be either a bottom support stand or a suspension stand. In the bottom support stand the load cell rests directly atop a pair of upwardly extending legs which are configured to provide exact centers of non-support for the load cell which remain constant over the life of the load cell. In the suspension method the load cell is supported on a pair of suspension inserts which depend from a plurality of upright legs. A constant set of support points are also provided in the suspension system. With either type support for the load cell the dual pin double link weight transfer mechanism allows the upper and lower pins to be rotated within the links periodically or as required due to wear on the surfaces of the bearing pins.

BRIEF DESCRIPTION OF THE DRAWINGS

Apparatus embodying features of my invention are illustrated in the accompanying drawings which form a portion of this application and wherein.

DESCRIPTION OF A PREFERRED EMBODIMENT

Figure 1:
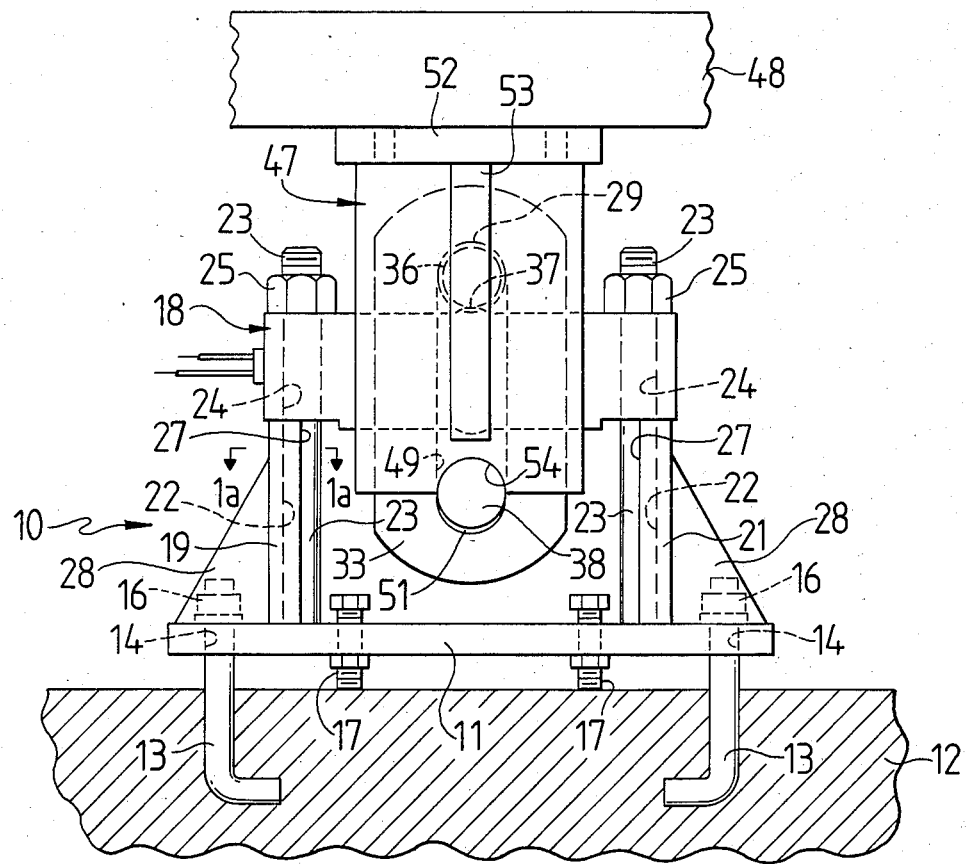
FIG. 1 is a side elevational view of the mounting structure utilizing a pair of support posts to which the load cell is mounted.

Referring to the Figures, the fixture 10 has a base plate 11 which is connected to a concrete foundation 12 by a plurality of preset anchor bolts 13 which extend through apertures 14 in the base plate 11 and are connected thereto by threaded members 16. The base plate 11 also contains leveling screws 17 which are used to level the entire fixture 11 by raising or lowering or tilting from side to side and front to back as necessary to insure that a load cell 18 mounted on the fixture will be level at all times. The stand is locked in place by use of the threaded members 16 on the anchor bolts 13 after it has been leveled using the leveling screws 17. A pair of upright plate-like posts 19 and 21, made from milled steel, are welded to the base plate 11 and are sized in accordance with the particular scale system for which the fixture is used. Each post 19 or 21 is milled with a concave groove 22 along its longitudinal, upright inner surface, as shown in FIG. 1a, and accommodates an upright threaded stud 23 which is positioned in the groove 22 and welded into place. These studs 23 project through preformed holes 24 in the load cell 18. A pair of standard threaded nuts 25 are used to lock the load cell 18 in place atop the posts 19 and 21. The inside edges 27 of the posts are positioned to correspond with the exact center of the holes 24 in the load cell 18. Therefore, when the load cell is mounted the top of each of the posts 19 and 21 becomes a bearing surface for the under side of the load cell 18 and the inside edges 27 define a region of non-support beneath the load cell 18. This mounting assures that the load cell 18 is held captive and thus creates a constant flexing surface along the load cell 18 which increases the accuracy of the load cell 18. Inasmuch as each load cell in each fixture 10 to be used in a scale can be tuned to the exact same flexible surface dimension, this particular feature makes possible the use of multi-load applications in larger scales. Each post 19 and 21 is strengthened by a gusset 28 which may vary in size and location, as shown in FIGS. 1 and 2, in order to accommodate different sizes and capacities of load cells.

Figure 2:
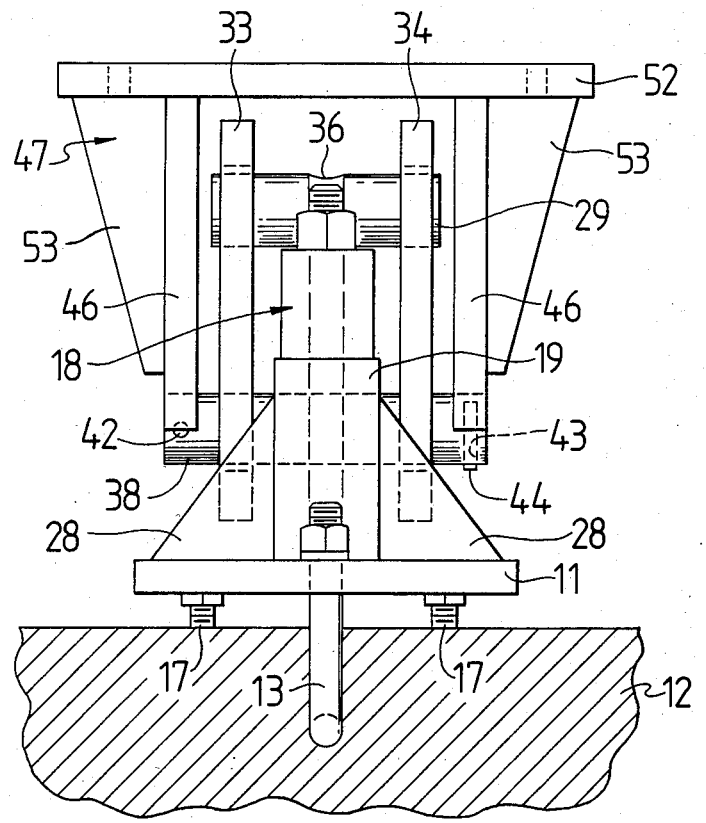
FIG. 2 is an end view of the apparatus as shown in FIG. 1.
Figure 3A:
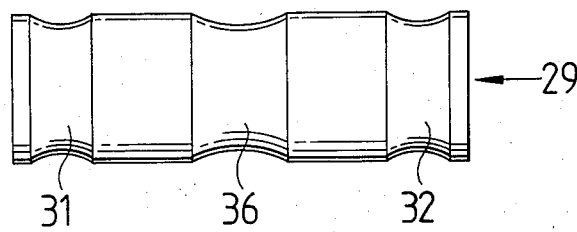
FIG. 3a is an elevational view of the upper weight bearing pin.
Figure 1A:
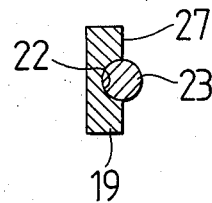
FIG. 1a is a sectional view taken generally along the line 1a—1a of FIG. 1.

Referring to FIG. 3a, as well as FIGS. 1 and 2, an upper pin 29 is mounted perpendicular to and atop the load cell 18. The upper pin 29 uses a 41/40 prehardened round steel pin which is stronger than a milled steel pin. The hardened surface of the upper pin 29 is wear resistant and is machined with three one-eighth inch deep grooves. The outside grooves 31 and 32 are one-eighth inch from each edge and three-fourths inch wide and are concave in shape. These outside grooves 31 and 32 become checking and aligning points for a pair of links 33 and 34 which will be suspended from this upper pin 29. The center groove 26 is also a concave groove and is one and one-half inches wide with its deepest point centered on the upper pin 29. This groove is for use with load cells that have a convex load bearing surface, shown at 37, on which the groove 36 is to rest. Thus the actual contact between the upper pin 29 and the load cell 18 is limited to approximately one degree of the angular measure of the two round surfaces. This contact between the load cell 18 and the upper pin 29 is thus pin-pointed and remains constant even during loading or unloading. The concave groove 36 also enables the upper pin 29 to be self-checking and self-aligning. Also, it will be noted that the pin does not normally rotate after being positioned in the fixture 10; however if wear becomes apparent on the pin 29, the pin can be rotated a few degrees to provide a completely new and unworn bearing surface, thereby extending the longevity of the pin and fixture.

Figure 3B:
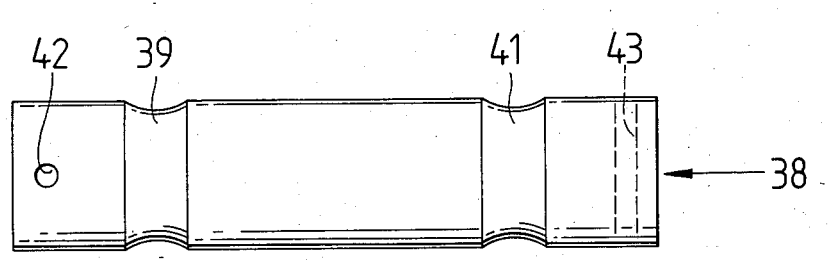
FIG. 3b is an elevational view of the lower weight bearing pin.
Figure 5:
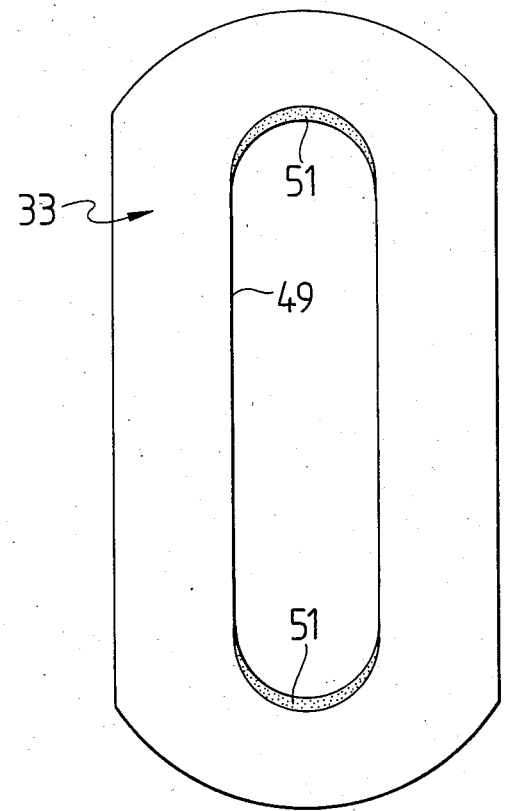
FIG. 5 is an elevational view showing the link member.

Supported by the links 33 and 34 below the load cell 18 is a lower pin 38 which is also made from prehardened 41/40 steel and has two one-eighth inch deep concave grooves 39 and 41 which correspond to the grooves 31 and 32 of the upper pin, as shown in FIG. 3b. The grooves act as self-checking and self-aligning points for the links 33 and 34 which fit within the grooves on the upper pin 29 and the grooves on the lower pin 38. The lower pin extends longitudinally outwardly of the links 33 and 34 and has a pair of holes 42 and 43 drilled transversely through the center of the pin. The holes 42 and 43 are perpendicular to each other, as shown in FIG. 2. The lower pin will be positioned in the links 33 and 34 such that one of the holes 42 or 43 is aligned in the vertical plane to receive a pedestal pin 44 which depends from one of two legs 46 of a pedestal 47 which supports the weigh bridge 48 of the scale. Note that if wear becomes apparent in the grooves 39 and 41 the lower pin 38 can be rotated ninety degrees to provide a new and unworn bearing surface thereby extending the accuracy and the longevity of the lower pin 38 and the fixture 10.

The links 33 and 34 are oval-shaped and have an oval-shaped opening 49 in the center thereof so that they may engage the grooves 31 and 32 on the upper pin and the grooves 39 and 41 on the lower pin. Each end of the opening 49 has a prehardened concave insert 51 welded thereinto. This prehardened insert 51 acts as a bearing surface against the upper and lower bearing pins and inasmuch as the insert is concave and the pins are round, pinpoint contact between the surfaces occurs.

The pedestal, or chair assembly as it is oftentimes called, is constructed of material suitable for the load capacity of the given application. The pedestal 47 has a top 52 that has a plurality of mounting holes formed therein which are suitable for attaching the top 52 to the weigh bridge 48 or other structural component of the body to be weighed. The legs 46 are rigidly gusseted and welded into place as at 53 and have a half circle section 54 removed from the bottom of the leg. The center portion of the section 54 is tapped to receive the pedestal pin 44 which is fixed into place therein and thereafter mates with the hole 42 or 43 of the lower pin 38 thereby locking the pedestal 47 to the lower pin 38.

It may be seen that the fixture 10 is a floating platform which supports the item to be weighed, such that any movement by the material or the item being weighed will be converted by the fixture into a steady downward pressure on the load cell 18. Thus the load cell 18 provides an accurate measure in all types of applications and is particularly adapted for providing accurate measurements where the movement of the item being weighed is a complicating factor, such as where animals are being weighed or where movement of the product while being loaded is a factor. The fixture 10 may also be utilized in a weigh-in motion type of scale such as those used to weigh vehicles or trains as they move across the weighing platform without stopping.

Figure 4:
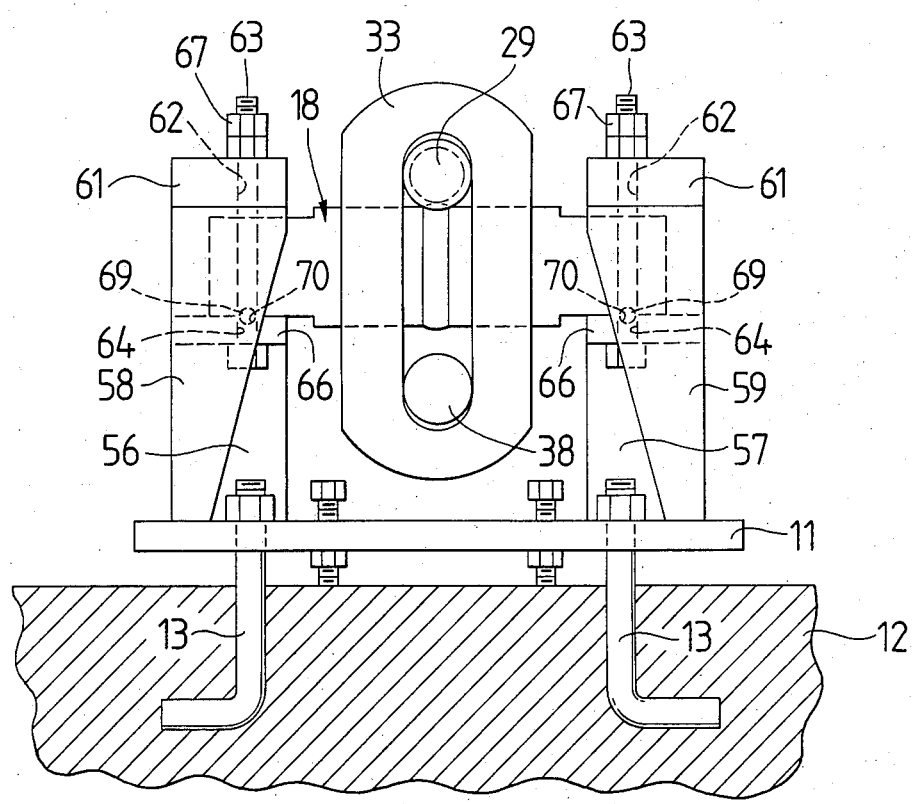
FIG. 4 is an elevational view of the load cell mounting structure using a pair of suspended lower inserts to support the load cell.

An alternative embodiment is shown in FIG. 4. This embodiment uses the same combination of elements to support the weigh bridge on the load cell 18. However the load cell itself is supported in a different manner. The base plate 11 is anchored to the foundation 12 by the anchor bolt 13 in the same manner; however the posts 19 and 21 are replaced by a plurality of upstanding legs 56–59. Legs 56 and 57 are the back legs and legs 58 and 59 are the front legs. Each back and front leg supports a top member 61 which has an aperture 62 therethrough. A bolt 63 is positioned within each aperture 62 and also extends through an aperture 64 in a level insert 66 which is positioned between the front and back legs beneath the top member 61. This level insert 66 must fit snugly between the legs. The load cell 18 is positioned atop the level insert 66 such that the bolt 63 extends upwardly through the insert 66, the load cell 18 and the top member 61. The bolt 63 is held in position by threaded nuts 67. The level insert 66 is formed such that the aperture 64 is closer to the inner edge of the insert. A groove 70 is formed in the upper surface of the level insert 66 adjacent the aperture 64 and runs transversely of the load cell 18. An edge forming pin 69 is laid in each groove beneath the load cell 18 to provide a well defined edge of support for the load cell 18. The front legs are preferentially tapered towards the lower portion thereof. It may be seen that this embodiment not only enjoys the advantages of maintaining the force exerted by the load in a uniform downward direction at a uniform position but also enjoys the advantages of being additionally adjustable by virtue of the suspension bolt 63 and threaded nuts cooperating therewith. Furthermore, since the load cell is suspended beneath the top members 61 it is not susceptible to the rebound shock common in rigidly supported load cell fixtures. Thus the load cell 18 is virtually free from binding side loading pressures and loading shock damages. In both embodiments the load cell 18 is precisely mounted on the exact loading points specified by the manufacture and the load is applied to the load cell at precisely the point specified by the manufacturer; therefore either embodiment greatly enhances the accuracy of the load cell.

While we have shown our invention in two forms, it will be obvious to those skilled in the art that it is not so limited, but is susceptible of various other changes and modifications without departing from the spirit thereof.

What we claim is:

1. Apparatus for mounting a double-end shear beam load cell for use in a scale comprising:
   (a) means for supporting said load cell in a predetermined position and orientation;
   (b) an upper pin adapted for engagement with said load cell over a specified area and positioned above said load cell;
   (c) a lower pin positioned beneath said load cell and parallel to said upper pin, said lower pin receiving the weight of said load; and
   (d) link means for connecting the ends of said upper pin to said lower pin with said lower pin supported by said upper pin and said lower pin being free to oscillate responsive to the forces exerted on said lower pin in said scale, such that the force transferred to said load cell remains substantially constant in direction and area of application.

2. Apparatus as defined in claim 1 wherein said upper pin has an annular groove about the center thereof for receiving a convex load bearing surface of said load cell, whereby contact between said load cell and said upper pin is defined by the intersection of said groove and said convex load bearing surface.

3. The apparatus as defined in claim 1 wherein said upper pin has a pair of annular grooves each proximal an end of said upper pin for receiving said link means.

4. Apparatus as defined in claim 3 wherein said link means is a pair of generally oval-shaped members each having a generally oval opening therein with said upper and lower pins extending through said openings such that said lower pin rests on said links and said links rest on said upper pin.

5. Apparatus as defined in claim 4 wherein said means for supporting said load cell, comprises:
   (a) rigid stand having two upright members supporting said load cell proximal each end thereof;
   (b) a threaded member extending through a preformad hole in each end of said load cell adjacent each upright member; and
   (c) a locking member threadedly engaging said threaded member above said load cell for retaining said load cell in constant abutting relationship with said stand whereby said load cell remains flexible but is restrained from rotational or longitudinal movement.

6. Apparatus as defined in claim 4 further comprising prehardened concave inserts affixed within each of said links forming a bearing surface between said links and said upper and lower bearing pins.

7. Apparatus as defined in claim 4 wherein said means for supporting said load cell comprises:
   (a) a rigid upright support having upwardly extending legs;
   (b) an apertured cover extending between said legs; and
   (c) suspension means for holding said load cell suspended beneath said cover whereby said load cell is restrained from rotational or longitudinal movement.

8. Apparatus as defined in claim 7 wherein said suspension means comprises:
   (a) a level insert member having an aperture therethrough cooperatively positioned beneath each said cover and having a transversely extending upwardly opening groove on each side of said aperture;
   (b) an adjustable connector extending through the aperture in said insert member, said cover member, and a preformed hole in said load cell for supporting said insert member and said load cell beneath said cover; and
   (c) an edge forming member positioned in said grooves and supporting said load cell.

9. Apparatus for mounting a double-end shear beam load cell comprising:

(a) a support for holding said load cell in a position wherein said load cell has a uniform flexible surface between precisely located points of support; and (b) means for isolating said load cell from variations in points of loading resulting from movement of the load including an upper bearing pin positioned above and perpendicular to said load cell supported by said load cell substantially at the midpoint thereof, a lower bearing pin positioned below said load cell and parallel to said upper bearing pin and receiving the load at each end thereof, and a pair of substantially oval shaped link members connecting said upper and lower bearing pins proximal the ends thereof with said links supported by said upper bearing pin and said lower bearing pin supported by said links such that the weight of said load is transferred from said lower bearing pin to said upper bearing pin via said links.

10. Apparatus for mounting a double-end shear beam load cell for use in a scale comprising:

(a) means for supporting said load cell in a predetermined position and orientation;

(b) an upper pin adapted for engagement with said load cell over a specified area and positioned above said load cell;

(c) a lower pin positioned beneath said load cell and parallel to said upper pin, said lower pin receiving the weight of said load;

(d) link means for connecting the ends of said upper pin to said lower pin whereby said lower pin is supported by said upper pin and said lower pin is free to oscillate responsive to the forces exerted on said lower pin in said scale, such that the force transferred to said load cell remains substantially constant in direction and area of application, said link means comprising a pair of generally oval shaped members each having a generally oval opening therein with said upper and lower pins extending through said openings such that said lower pin rests on said links and said links rest on said upper pin, with said upper pin having a pair of annular grooves each proximal an end of said upper pin for receiving said link means; and (e) a pedestal for receiving the weight of a load adapted to rest on said lower pin at each end thereof.

11. Apparatus for mounting a double-end shear beam load cell for use in a scale comprising:

(a) means for supporting said load cell in a predetermined position and orientation including
 (i) a base plate,
 (ii) adjustable means for leveling said base plate,
 (iii) a pair of upright posts, affixed to said base plate, each supporting one end of said load cell with said posts having inside edges facing each other being positioned on said base plate such that said edges are aligned with the center of preformed mounting holes in said load cell, and
 (iv) a fastener affixed to each of said posts and extending upward through said mounting holes for connecting said load cell to said posts;

(b) an upper pin adapted for engagement with said load cell over a specified area and positioned above said load cell;

(c) a lower pin positioned beneath said load cell and parallel to said upper pin, said lower pin receiving the weight of said load; and (d) link means for connecting the ends of said upper pin to said lower pin whereby said lower pin is supported by said upper pin and said lower pin is free to oscillate responsive to the forces exerted on said lower pin in said scale, such that the force transferred to said load cell remains substantially constant in direction and area of application, said link means comprising generally oval-shaped members each having a generally oval opening therein with said upper and lower pins extending through said openings such that said lower pin rests on said links and said links rest on said upper pin, said upper pin having a pair of annular grooves each proximal an end of said upper pin for receiving said link means.

12. Apparatus for mounting a double-end shear beam load cell comprising:

(a) a support for holding said load cell in a position wherein said load cell has a uniform flexible surface between precisely located points of support;

(b) means for isolating said load cell from variations in points of loading resulting from movement of the load, including
 (i) an upper bearing pin positioned above and perpendicular to said load cell supported by said load cell substantially at the midpoint thereof,
 (ii) a lower bearing pin positioned below said load cell and parallel to said upper bearing pin, and
 (iii) a pair of substantially oval shaped link members connecting said upper and lower bearing pins proximal the ends thereof whereby said links are supported by said upper bearing pin and said lower bearing pin is support by said links; and (c) a pedestal for receiving the weight of said load supported on said lower bearing pin.

13. Apparatus for mounting a double-end shear beam load cell comprising:

(a) a support for holding said load cell in a position wherein said load cell has a uniform flexible surface between precisely located points of support including
 (i) an adjustable base having a plurality of upwardly extending posts, and
 (ii) means for suspending said load cell between said posts whereby said load cell is restrained from rotational or longitudinal motion and said isolating means is supported by said load cell; and (b) means for isolating said load cell from variations in points of loading resulting from movement of the load, including
 (i) an upper bearing pin positioned above and perpendicular to said load cell supported by said load cell substantially at the mid-point thereof,
 (ii) a lower bearing pin positioned below said load cell and parallel to said upper bearing pin, and
 (iii) a pair of substantially oval shaped link members connecting said upper and lower bearing pins proximal the ends thereof whereby said links are supported by said upper bearing pin and said lower bearing pin is supported by said links.

14. Apparatus as defined in claim 13 wherein said means for suspending comprises:

(a) an apertured top plate affixed to said posts at each end of said load cell;

(b) an apertured bottom plate beneath and aligned with said top plate such that said load cell is intermediate said plates;

(c) means for connecting said plates whereby said load cell is confined between said plates; and (d) an edge forming member positioned on said bottom plate and supporting said load cell along a well defined line transversely of said load cell.

* * * * *